United States Patent
Izhutov et al.

(10) Patent No.: US 11,067,517 B2
(45) Date of Patent: Jul. 20, 2021

(54) NEUTRON RADIOGRAPHY METHOD AND APPARATUS FOR THE IMPLEMENTATION THEREOF

(71) Applicant: STATE ATOMIC ENERGY CORPORATION "ROSATOM" ON BEHALF OF THE RUSSIAN FEDERATION, Moscow (RU)

(72) Inventors: Alexey Leonidovich Izhutov, Dimitrovgrad (RU); Nikolay Ivanovich Kroshkin, Dimitrovgrad (RU); Vitaliy Aleksandrovich Neverov, Dimitrovgrad (RU)

(73) Assignee: STATE ATOMIC ENERGY CORPORATION "ROSATOM" ON BEHALF OF THE RUSSIAN FEDERATION, Moscow (RU)

( * ) Notice: Subject to any disclaimer, the term of this patent is extended or adjusted under 35 U.S.C. 154(b) by 0 days.

(21) Appl. No.: 16/319,683

(22) PCT Filed: Jul. 18, 2017

(86) PCT No.: PCT/RU2017/000530
§ 371 (c)(1),
(2) Date: Jan. 22, 2019

(87) PCT Pub. No.: WO2018/016994
PCT Pub. Date: Jan. 25, 2018

(65) Prior Publication Data
US 2019/0360949 A1    Nov. 28, 2019

(30) Foreign Application Priority Data
Jul. 22, 2016    (RU) .......................... RU2016130254

(51) Int. Cl.
*G01N 23/05* (2006.01)

(52) U.S. Cl.
CPC ....... *G01N 23/05* (2013.01); *G01N 2223/414* (2013.01); *G01N 2223/625* (2013.01)

(58) Field of Classification Search
CPC ............ G01N 23/05; G01N 2223/625; G01N 2223/414; G01N 2223/106
See application file for complete search history.

(56) References Cited

U.S. PATENT DOCUMENTS

| 4,918,315 A | * | 4/1990 | Gomberg | ............. | G01N 23/204 |
| | | | | | 250/390.04 |
| 6,923,374 B2 | | 8/2005 | Knowles et al. | | |

(Continued)

FOREIGN PATENT DOCUMENTS

| JP | H0385432 A | 4/1991 |
| RU | 2362148 C1 | 7/2009 |

(Continued)

OTHER PUBLICATIONS

International Search Report of corresponding PCT/RU2017/000530 application dated Nov. 30, 2017, 5 pages.

(Continued)

*Primary Examiner* — Christine S. Kim
(74) *Attorney, Agent, or Firm* — Brooks Kushman P.C.

(57) ABSTRACT

A method and apparatus for neutron radiography is provided for the examination of elongate radioactive items, primarily nuclear fuel elements, and also for the non-destructive testing of irradiated and non-irradiated objects in order to determine the internal structure and material composition thereof. The method and apparatus include placing an object under examination into a protective container. A detection system includes a rotatable limb with a mounting seat for securing neutron detectors in a diametric groove. The limb being mounted to be rotatable by a set angle about an axis parallel to the axis of the object under examination and having a semi-circular recess therein for the passage of an (Continued)

elongate object as the limb rotates by an angle $\pm\alpha_i$ relative to the direction of a neutron beam.

3 Claims, 2 Drawing Sheets

(56) References Cited

U.S. PATENT DOCUMENTS

| | | | |
|---|---|---|---|
| 7,356,115 B2* | 4/2008 | Ford | G01N 23/046 |
| | | | 378/4 |
| 2013/0208843 A1* | 8/2013 | Mauerhofer | G01N 23/222 |
| | | | 376/159 |
| 2013/0264486 A1* | 10/2013 | Bingham | G01N 23/05 |
| | | | 250/390.02 |
| 2018/0330839 A1* | 11/2018 | Scott | G01N 23/046 |
| 2019/0189294 A1* | 6/2019 | Mezei | G21C 1/30 |

FOREIGN PATENT DOCUMENTS

| | | |
|---|---|---|
| RU | 2502986 C1 | 12/2013 |
| RU | 2505801 C1 | 1/2014 |
| SU | 199476 A1 | 7/1967 |
| WO | 2018016994 A1 | 1/2018 |

OTHER PUBLICATIONS

Written Opinion of corresponding PCT/RU2017/000530 application dated Nov. 30, 2017, 7 pages.

International Preliminary Report on Patentability of corresponding PCT/RU2017/000530 application dated Jan. 22, 2019, 9 pages.

* cited by examiner

NEUTRON RADIOGRAPHY METHOD AND APPARATUS FOR THE IMPLEMENTATION THEREOF

CROSS-REFERENCE TO RELATED APPLICATIONS

This application is the U.S. national phase of PCT Application No. PCT/RU2017/000530 filed on Jul. 18, 2017, which claims priority to RU Patent Application No. 2016130254 filed on Jul. 22, 2016, the disclosures of which are incorporated in their entirety by reference herein.

TECHNICAL FIELD

The invention relates to neutron radiography and can be used for the examination of elongated radioactive items, primarily nuclear fuel elements, and also for the non-destructive testing of irradiated and non-irradiated objects in order to determine the internal structure and material composition thereof.

It is known the method for neutron imaging by the direct exposure consisting in calculating the background Y-radiation exposure dose and the exposure time, mounting the detector and recording the neutron-radiography image on photographic materials. (N. D. Tyufyakov, A. S. Shtan, Principles of Neutron Radiography, M., Atomizdat, 1975, p. 250).

It is known the apparatus for neutron-radiography viewing, where the neutron beam from the pool-type nuclear reactor is used and the beam collimation can be smoothly varied by changing collimator port dimensions (Radiation technology, Rev. 16. M., Atomizdat, 1978).

The apparatus comprises feed drives for feeding the item and the detector to the control position, the means for securing the activation detector to transfer thereof from the carriage to the photocontainer, the pneumatic system to supply compressed air required to hold down the activated screen to the X-ray film.

The item is exposed to radiation inside the radiographic box of 150×1200 mm² at a single aspect at the striking angle of the collimated neutron beam with respect to the item plane and the detector plane equal to 90°. When a defect was found, to determine a reason of this defect it was required to inspect it at one or more other angles. For this purpose, the radiated item had to be transported from the radiographic box to the protective box multiple times, the item had to be rotated in the protective container and returned back to the radiation position.

It is known the method for neutron radiography (N. G. Kocherygin, V. D. Kozmenko, Apparatus for defectoscopy of highly active samples, A. C. No. 199476, cl.42k, 46/07, IPC G01n, 1967) consisting in placing the sample under examination in the movable cross-beam of the upright protective container which is then positioned horizontally above the vertical channel of the reactor neutron beam, and setting the cross-beam speed and the rate of reduction of the given aperture value. The speed of cross-beam passage and the aperture change rate are selected empirically, and at the end of the irradiation to obtain a clear image on the film the uniform background of the activated screen and its sufficient activity is provided.

SUMMARY

The apparatus for implementing the method comprises the neutron source, the operating container, the movable cross-beam inside the operating container to receive the sample under examination therein, the passing mechanism to pass the cross-beam perpendicularly to the neutron flow direction, the aperture variation mechanism, the photocontainer, the handling mechanism to move the non-activated screen from the operating container to the photocontainer.

This device is designed to examine samples and items of a small length. For long items, it is required to use containers which are twice higher than the item itself. Bulky containers are difficult to handle because when delivered to the field of measurements such bulky containers need to be moved from the vertical (transportation) position to the horizontal ("radiographic viewing") position.

The dimension of the neutron beam at the exit of elongated vertical channels is minimized (no more than 50-100 mm). As a result, the cross-beam with the item in the container re-oriented from the vertical position to the horizontal position is required to be moved step-by-step multiple times which is very time consuming.

In order to visualize space variations and parameters of a zone with defects propagating along the length and radius of examined items, it is required to capture images of items being rotated around the axes of these items and passed across the input beam. This requires several neutron "radiographic viewings" and multiple additional operations which include, among other things, returning the container with the item therein to the protective box where a highly-active item is remotely subjected to respective mechanical manipulations.

With so many repositions and displacements, highly-active items can be damaged for any unexpected reason which can lead to any severe radiative accident. Furthermore, each new radiographic viewing (irradiation with a neutron beam) of the item under examination containing nuclear fuel increases the accumulation of additional activity. Because of this, the presence of such item within a central hall becomes each time more radiationally hazardous for personnel who service such apparatus.

Transferring a hidden image from the screen to a film in the photocontainer in the central hall environment is not the best idea because other radiation sources can provide an additive background.

The object of the present invention is to improve the informative value, accuracy, and clarity of radiographic examination results.

Said object can be attained by a method of neutron radiography consisting in placing an object under examination into a protective container, placing the container on a bed via a mounting seat and rigidly securing the object therein, mounting a first detector in a groove in a limb integrated into the bed and made in the form of a rotatable disk with a semi-annular recess, setting an angle (+α) between the direction of radiation and the detector, supplying a neutron beam, after irradiation moving the first detector for transferring the activity distribution obtained on the first activation detector to the first photofilm, (i.e. locating the first detector in a special container to bring it into contact with a photofilm), mounting a second detector in the groove, setting an angle (−α) between the direction of radiation and the detector, carrying out irradiation, after irradiation moving the second detector from for transferring the activity distribution obtained on the second activation detector to the second photofilm, and processing exposed films to obtain images at angles of ±α, (|+α|=−α|), varying which a stereoscopic image can be produced.

It has been empirically confirmed that the angle (±α) is selected from the range of 40° to 80°.

To acquire high-quality images the density of the neutron beam shall be monitored and the second exposure is carried out with the same neutron flow density as the first exposure.

An apparatus for the implementation of the method for objects under examination by the neutron radiography, which comprises a source of neutrons, a protective container for an object under examination, a detection system having a flat activation detector, additionally comprises a bed having disposed thereon a detection system in the form of a rotatable limb having a mounting seat in the form of a diametric groove for securing neutron detectors, said limb being mounted such as to be rotatable by a set angle about an axis parallel to the axis of the object under examination, and having a semi-annular recess therein for the passage of the object under examination being an elongate object as the limb rotates by an angle $\alpha_i$ relative to the direction of a neutron beam.

The container with the item under examination is placed into the mounting seat and rigidly secured with a locker. A rotation center of the limb is mounted in a ball-bearing integrated into the bed and the limb rests upon rollers mounted in a annular track of the limb.

A limb has a diametric groove having a width and length suitable for the detector to be mounted therein.

The limb is mounted in one of the selected positions which are oriented at an angle of $\alpha_i$ with respect to the axis of the neutron beam, where i can have different but strictly defined and fixed values for one pair of measurements.

By changing an orientation angle ($\alpha_i$) of angular placement of the detectors, being, for example, activating plates, and acquiring, respectively, pairs of X-ray images, it is possible, in two or three steps, to fully describe available patterns of defects in an object under examination, the state of shells, welds produced either during the manufacture, or in the result of modifications in the objects under examination due to the intensive impact of reactor radiations and high temperatures.

Both activation images must be acquired on the same (in terms of power and composition) neutron beam without changing the position of the product under examination on the bed.

By mounting two detectors in series with one detector at an angle $+\alpha$, and another in the inverted position at an angle $-\alpha$ (rotated by 180 degrees with respect to the beam axis) it becomes possible to acquire two images of object under examination, which form a stereoscopic pair having a predetermined image magnification ratio equal to $1/\sin \alpha i$.

The usage of a three-dimensional neutron radiography significantly expands the borders of visual analysis of defects in objects under examination in comparison to the common method of production of radiographic images of defects.

The limb rotatably mounted on the bed and provided with the groove for activation detectors and the annular recess having an angular length of 180° and width equal to a diameter of the container with the object under examination inside, allows making object images at different angles and obtaining a stereoscopic pair for an object three-dimensional image.

The limb is automatically rotated by set angles via a rotation and fixation mechanism.

DETAILED DESCRIPTION

Figure 1:
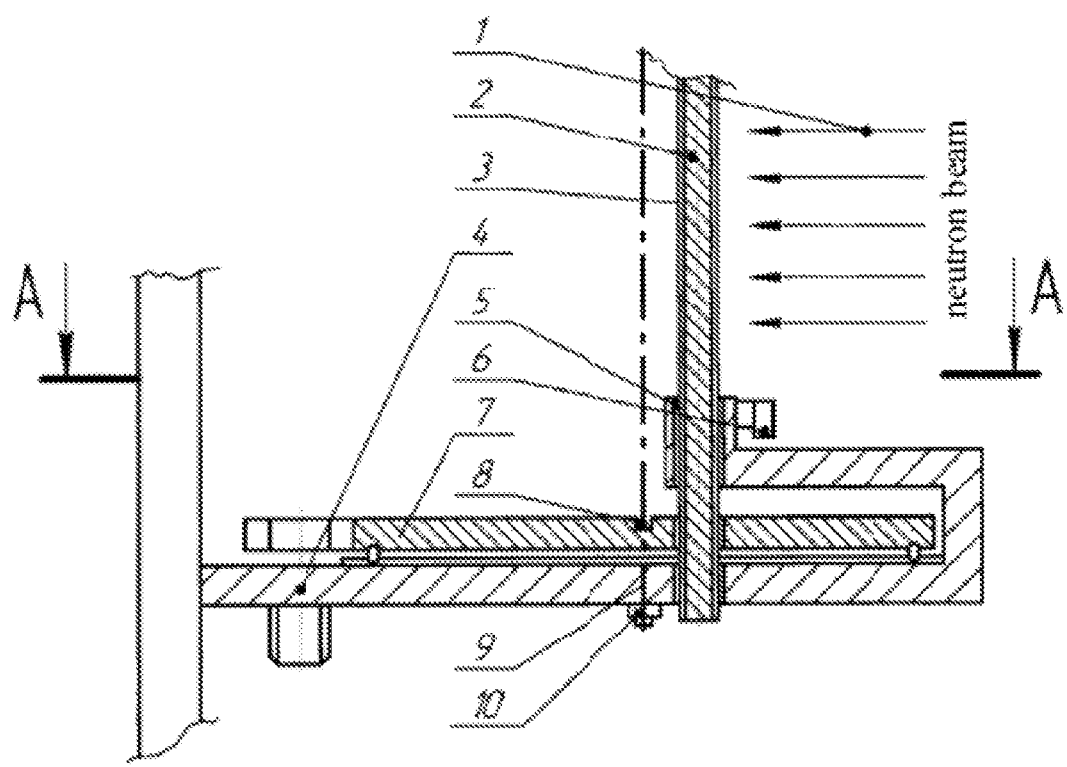
FIG. 1 shows an overall view of an apparatus, and
FIG. 2 (*a*) shows a top view of the apparatus mounted on a limb, and FIG. 2 (*b*) shows a detector mounted in a groove.
Figure 2:
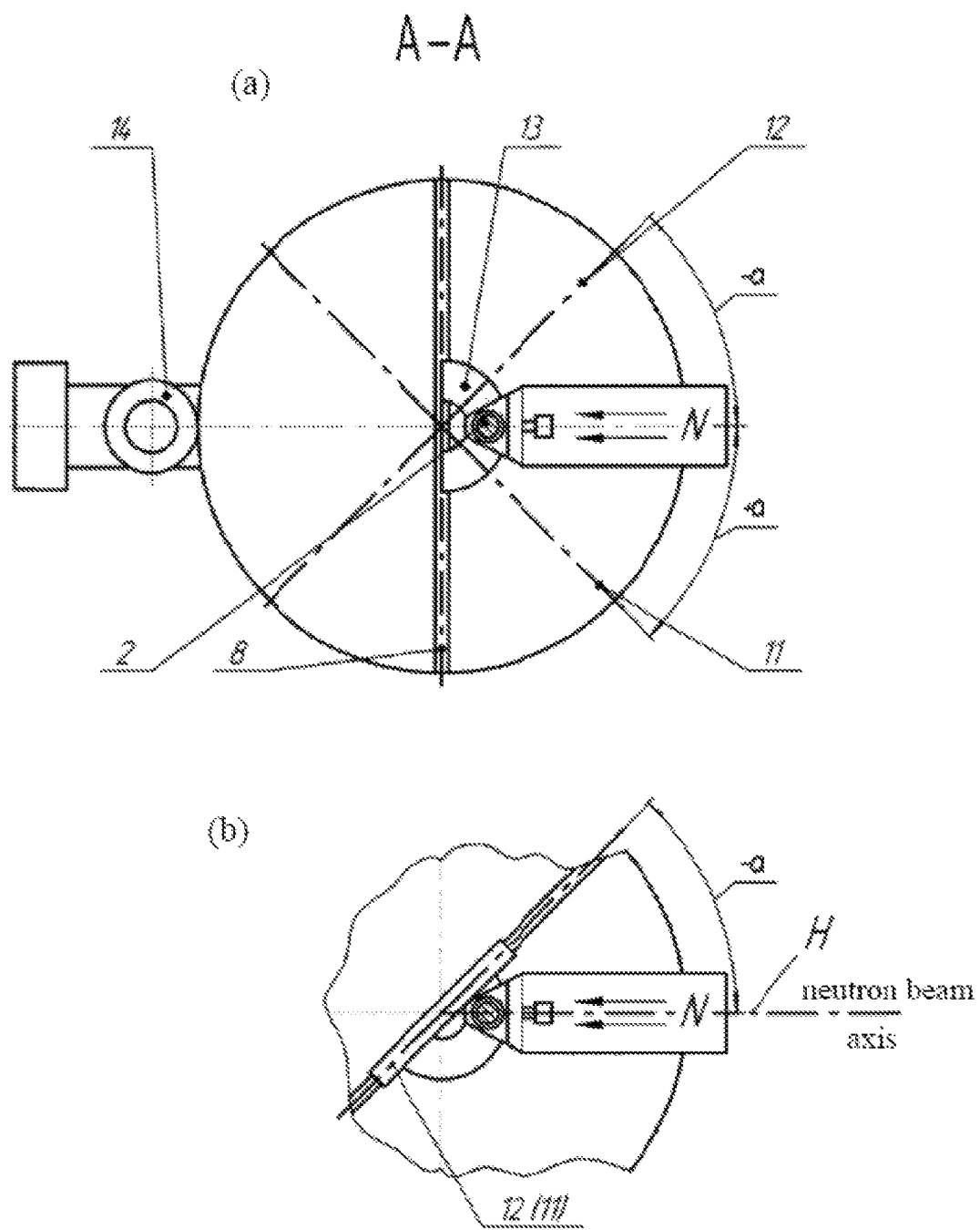

In Figures:
1—collimated neutron beam; 2—object under examination; 3—protective container; 4—bed; 5—mounting seat (socket); 6—locker; 7—rotatable limb; 8—groove; 9—limb rotation axis; 10—ball bearing; 11, 12—activation detectors; 13—semi-annular recess on limb; 14—mechanism for limb rotation and fixation at a predetermined angle.

An object under examination (a sample, an item) 2 is placed in a protective container 3. The container 3 is arranged on a bed 4 via a mounting seat 5 and is rigidly secured with a locker 6. The bed 4 is provided with a rotatable limb 7 in the form of a rotatable disk with an annular recess 13 an angular length of which is 180° and width is equal to a diameter of the container 3 with the object under examination 2 inside.

A rotation axis 9 of the limb 7 is mounted in a ball bearing 10 integrated into the bed 4 and the limb rests upon rollers (not shown) and has an annular recess 13. Paired activation detectors 11 and 12, the height of which has to be equal to the height of the radiographically viewed object under examination 2, are mounted alternately in the groove 8. Each of the activation detectors 11 and 12 mounted downstream the object under examination 2 can be one piece or composed of several parts. For statistics purpose (to a certain extent eliminating accidents caused by low-quality photomaterials used at subsequent stages of the imaging process), the same item 2 can be examined by this method several times. A selected angle of rotation of neutron detectors with respect to the beam axis is defined with the use of a known rotation and fixation mechanism 14, for instance, a synchro pair (a synchro generator and a synchro receiver), a discrete gear drive, a hole system below the limb on a stationary support and a spring-loaded locker on the limb 7, etc. The applied method has to ensure that the activation detectors 11 and 12 will be rotated to selected incident angles of a neutron beam which are numerically equal to each other ($|+\alpha_i|=|-\alpha_i|$), where the neutron beam is implemented during a first session of "radiographic viewing" of an object under examination and then during the second session.

After the first "radiographic viewing", in order to capture a good (with no loses) image of the activity generated on the activation detector having a low half-life, the activity distribution obtained on the activation detector 11 is transferred to an X-ray film, without waiting for the second irradiation. After the second activation detector 12 (with the same low half-life) has been irradiated, the image capturing procedure is repeated and this image is transferred on a second X-ray film. Next, negative images on the X-ray films are, in turn, transferred in a usual way on two photocopies. Both X-ray films (or photocopies) are viewed simultaneously on the corresponding stereoscopic equipment which is configured to combine these aspects in one three-dimensional visual object. The usage of such equipment and two X-ray films makes it possible to generate a 3D-image of the item 2 under examination.

By changing an orientation angle of activation detectors 11, 12 at a neutron beam ($\alpha_i$) and an obtained pair of X-ray images, respectively, it is possible, in two or three steps, to fully describe available patterns of defects in an object under examination, the state of shells, welds produced either during the manufacture, or in the result of modifications due to the intensive impact of reactor radiations and high temperatures.

The invention claimed is:
1. An apparatus for neutron radiography of an object under examination, comprising:
a source of neutrons
a protective container for the object under examination, a detection system having an activation detector, wherein the detection system is made in the form of a rotary limb having a seat in the form of a diametrical groove for securing the activation detector, a bed having disposed thereon a detection system being mounted such as to be rotatable by angles $+\alpha$ and $-\alpha$ about an axis parallel to the axis of the object under examination, wherein the limb has a semi-annular recess therein for the object under examination placed in the protective container, as well as for ensuring rotation of the limb at angle of $+\alpha$ and $-\alpha$ relative to the neutron source.

2. The apparatus according to claim 1, wherein a rotation center of the limb is additionally mounted in a ball-bearing integrated into the bed and the limb rests upon rollers arranged in an annular track of the limb.

3. The apparatus according to claim 1, wherein the limb is configured to automatically rotate at angles $+\alpha$ and $-\alpha$.

* * * * *